United States Patent
Slon et al.

(10) Patent No.: US 6,324,932 B1
(45) Date of Patent: Dec. 4, 2001

(54) TRANSMISSION SHIFTER UNIT WITH ROLLER BEARING FOR SHIFT CAM

(75) Inventors: Christopher M Slon, Birmingham; Daniel B Sauger, Macomb, both of MI (US)

(73) Assignee: DaimlerChrysler Corporation, Auburn Hills, MI (US)

( * ) Notice: Subject to any disclaimer, the term of this patent is extended or adjusted under 35 U.S.C. 154(b) by 0 days.

(21) Appl. No.: 09/472,357

(22) Filed: Dec. 23, 1999

(51) Int. Cl.[7] .............................. F16H 59/02; F16C 33/58
(52) U.S. Cl. ...................... 74/473.31; 74/533; 384/513
(58) Field of Search .................... 74/473.3, 473.31, 74/473.32, 533; 384/513

(56) References Cited

U.S. PATENT DOCUMENTS

| | | |
|---|---|---|
| 4,022,078 * | 5/1977 | Malott ................................ 74/473.3 |
| 4,934,208 | 6/1990 | Carlstrom . |
| 5,277,077 | 1/1994 | Osborn . |
| 5,289,732 | 3/1994 | Snell . |

* cited by examiner

*Primary Examiner*—Allan D. Herrmann
(74) *Attorney, Agent, or Firm*—Mark P. Calcaterra

(57) ABSTRACT

A low friction shifter unit for automatic transmissions comprising a minimized number of readily assembled parts that features a roller bearing and spacer unit that is operatively positioned between a fixed gate plate and the tapered hub of a rotatable shifter member to support the rotatable shifter member for limited rotation in response to the manual operation of an associated transmission shift lever. The gate plate and shift cam are operatively held together by a single threaded fastener advanced along the rotational axis of the rotatable shifter member to a positive stop position established by the roller bearing unit so that manufacturing tolerance stack up is minimized enhancing quantity production of such shifter units. The rotatable shifter member may be smoothly turned by manual operation of the transmission shift lever to the various gate detents or stop positions provided by the gate plate to move a push pull cable and associated actuator lever to condition the transmission for selected drive operation or for neutral or park.

4 Claims, 3 Drawing Sheets

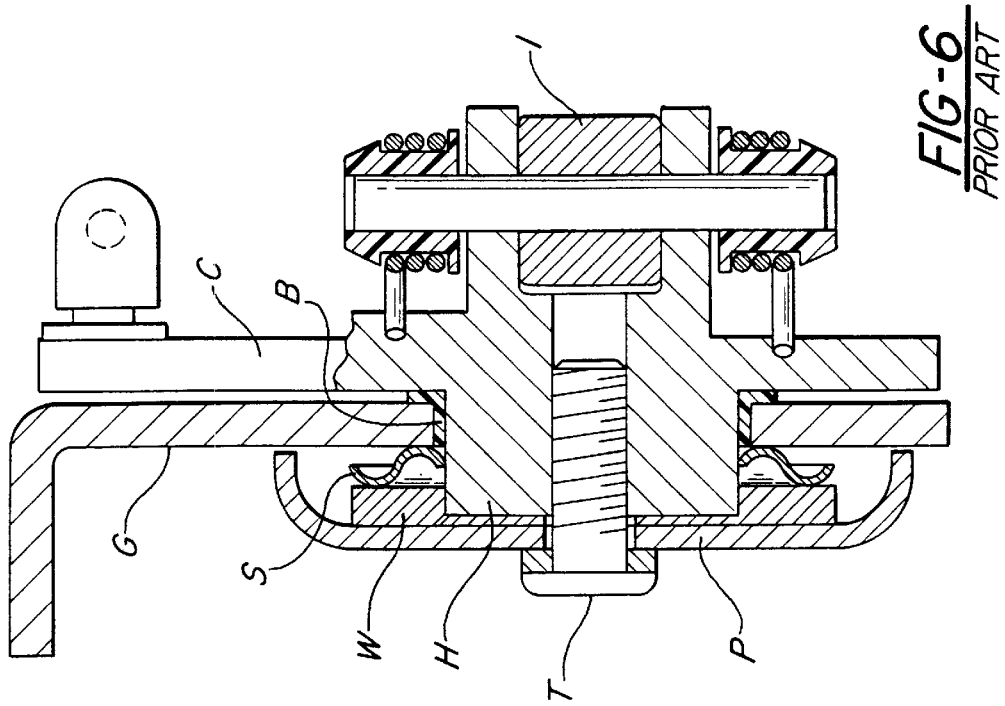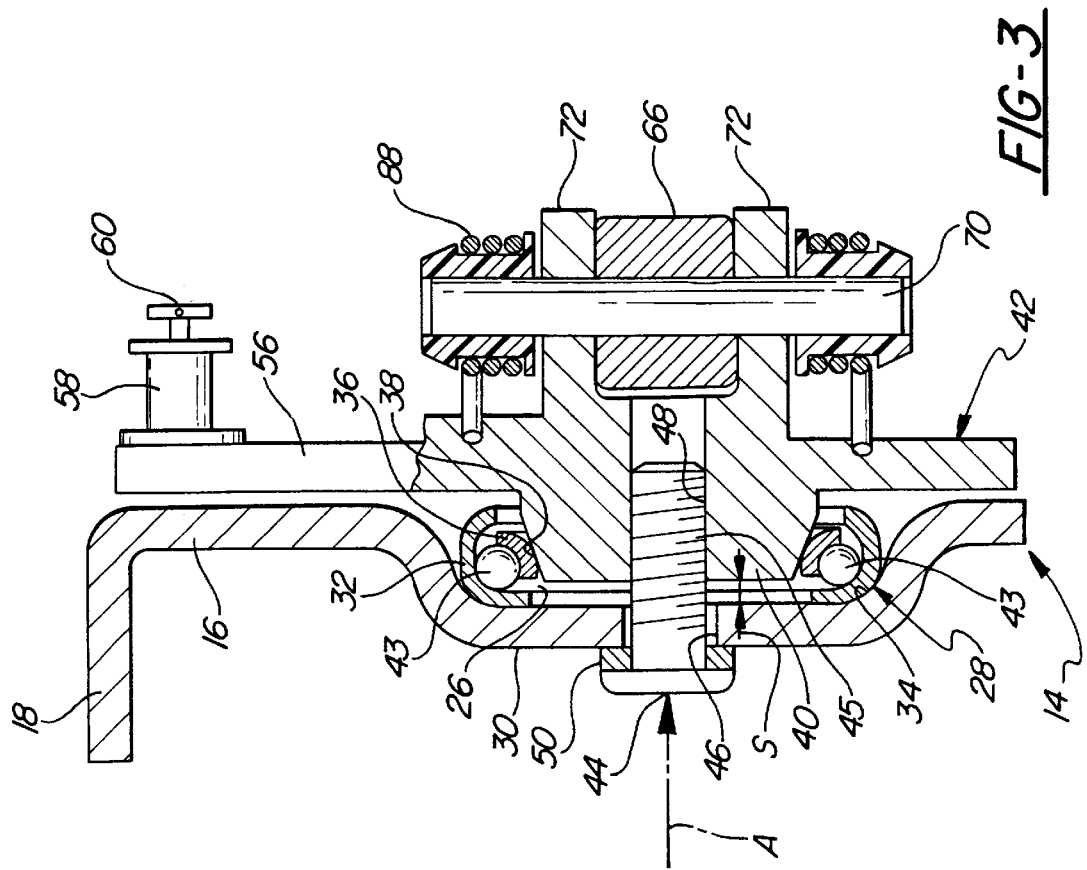

TRANSMISSION SHIFTER UNIT WITH ROLLER BEARING FOR SHIFT CAM

FIELD OF THE INVENTION

This invention relates to manual shift controls for automatic power transmissions employed in vehicles and more particularly to a new and improved low friction shifter unit for operative mounting on a vehicle steering column for selecting the various operations of the automatic power transmission of the vehicle.

DESCRIPTION OF RELATED ART

Prior to the present invention a wide range of shifter units have been developed to provide improved selection of the various functions of automatic transmissions in automobiles and thereby facilitate vehicle operation. This includes shifter units mounted on the steering column beneath the steering wheel so that the vehicle operator has convenient and efficient access to the transmission control lever thereof. U.S. Pat. No. 5,289,732 issued Mar. 1, 1994 to W. M. Snell for Column—Mounted Shift Control Assembly assigned to the assignee of this invention and hereby incorporated by reference is an example of one such shifter unit. FIG. 6 of the accompanying drawings to this specification diagrammatically illustrates a detail of a prior art shifter similar to that of U.S. Pat. No. 5,289,732 and shows a selector or shift lever L operatively connected to turn cam C having hub H mounted for sliding rotary movement within a shouldered bushing B supported by a fixed gate plate G. Also there is shown a wave spring S operatively disposed between a washer W and the side of the gate plate. A cover plate P outboard of washer W is retained on the end of the hub by threaded fastener T. The wave spring compensates for frictional wear and yieldably holds these parts in operative relationship with respect to one another to reduce looseness of the parts and prevent vibration thereof and resultant noise.

SUMMARY OF THE INVENTION

While the prior art shift control units fully meet requirements for which they were designed, they utilize components susceptible to wear from sliding friction and include wave spring washers to compensate for such wear. In contrast to the prior art constructions, this invention provides fixed and consistent spacing and rolling friction between the fixed gate plate having predetermined gate detents or stop stations thereon, and a rotatable shifter member that is rotated to various preselected positions by a manual lever operatively connected to the rotatable shifter member. This invention accordingly provides a new and improved low torque shifter unit for selecting transmission operations featuring a ball bearing spacer unit carried in a pocket in a gate plate and operatively disposed between the gate plate and the rotatable shifter member to operatively support the rotatable shifter member and reduce wear and precisely establish the axial positions of the components of the shifter unit. With this invention, each shifter unit of a mass produces quantity of units meets predetermined low tolerance specifications and each will operate in the same consistent and smoother manner with reduced manual input effort throughout an extended service life as compared to prior art constructions.

These and other objects, features and advantages will become more apparent from the following detailed description and drawings:

DESCRIPTION OF THE VIEWS OF THE DRAWINGS

FIG. 3 is a cross sectional view taken generally along sight lines 3—3 of FIG. 2;

FIG. 6 is a cross sectional view of a prior art construction.

DETAILED DESCRIPTION

Figure 1:
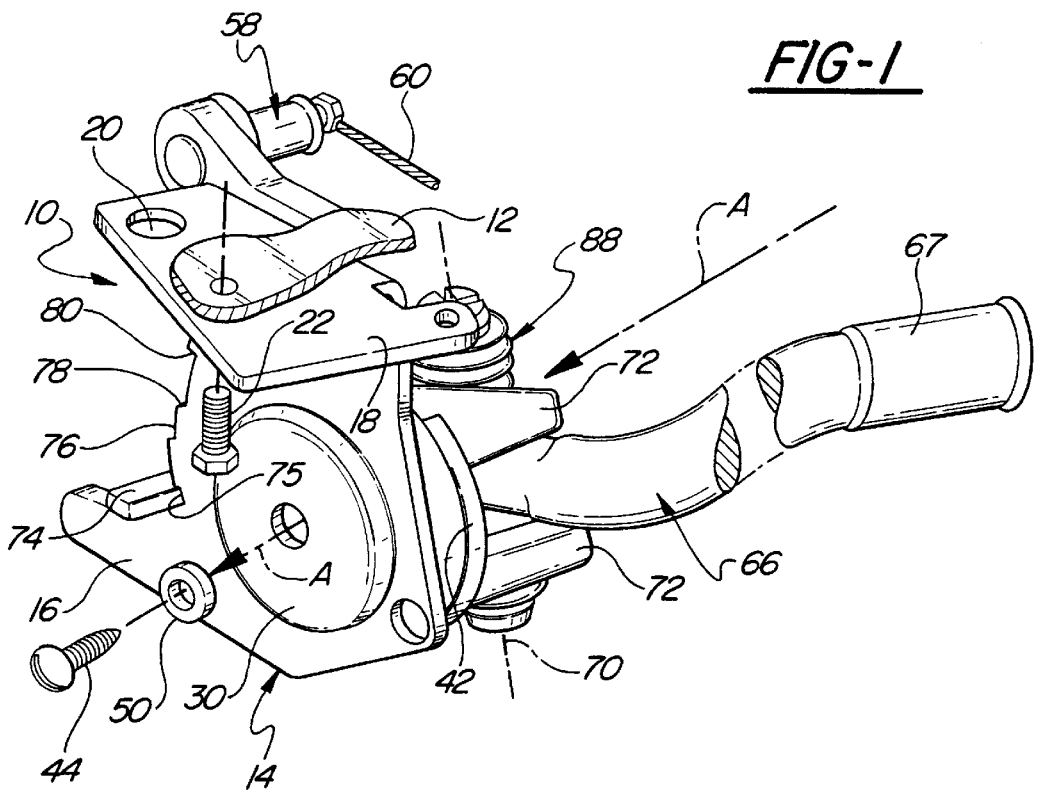
FIG. 1 is a pictorial view of one preferred embodiment of the invention.

Turning now in detail to the drawings, there is shown in FIGS. 1–5, an automatic power transmission shifter unit 10 operatively secured on a mounting block 12 of a steering column of an automotive vehicle. The shifter unit 10 comprises a gate plate 14 preferably stamped from sheet metal having an enlarged generally flattened side 16 and an integral upper attachment flange 18 extending at a right angle with respect thereto. An edge of side 16 of this plate has a series of gate detents 75, 76, 78, 80, and 82 formed thereon and identified by the letters D, R, N, D, L respectively in FIG. 4 and later described in greater detail which correspond to the different operations of the associated automatic transmission.

The attachment flange 18 has openings 20 therethrough that accommodate threaded fasteners 22 which rigidly secure the gate plate 14 and thereby the shifter unit 10 to the mounting block of the steering column. The flattened side 16 of the gate plate 14 has an annular pocket 26 (see FIG. 3) to house and support an annular ball bearing unit 28 (see FIG. 3) therein. The pocket can be formed by pressing or otherwise deforming a centralized wall portion 30 of the flattened side 16 in an outboard direction in a stamping or other appropriate operation. The ball bearing unit 28 has an outer annular race 32, which fits into the pocket 26 with the outer annular surface 34 thereof contacting the corresponding annular inner wall of the pocket as best shown in FIG. 3. An inner annular race 36 of the ball bearing unit 28 operatively seats on the conical or tapered annular shoulder 38 formed on the axially extending hub 40 of a shifter cam 42. An endless train of anti-friction ball bearings 43 is operatively enclosed between the outer and inner races.

The gate plate 14 and shifter cam 42 are operatively connected together by a threaded fastener 44 whose threaded shank 45 extends through a centralized opening 46 in gate plate 14 and into the aligned axial bore 48 in the hub of the shifter cam 42. The threaded fastener 44 may be a self-tapping screw or the bore can be threaded to mate with the threads of a conventional threaded fastener. A low friction washer 50 is installed between the head of the threaded fastener 44 and the outer surface of the gate plate 14. The threaded fastener 44 is advanced so that fixed and permanent spacings are established by the contacts of the ball bearing unit 28 with the tapered hub of the shifter cam 42 and the gate plate 14. Moreover,with the tapered hub and roller bearing construction of this invention, the rotatable shifter member 42 is operatively mounted for smooth, low-friction-turning movement with respect to the fixed gate plate 14. Also, with the use associated with this low friction movement, bearing wear of the components is minimized, hence, wave springs are not needed nor used, while service life of the rotatable shifter member 42 is materially increased as compared to prior art constructions. Moreover, tolerance stack up is substantially eliminated so that the construction of this invention is advantageous for high volume production.

Figure 2:
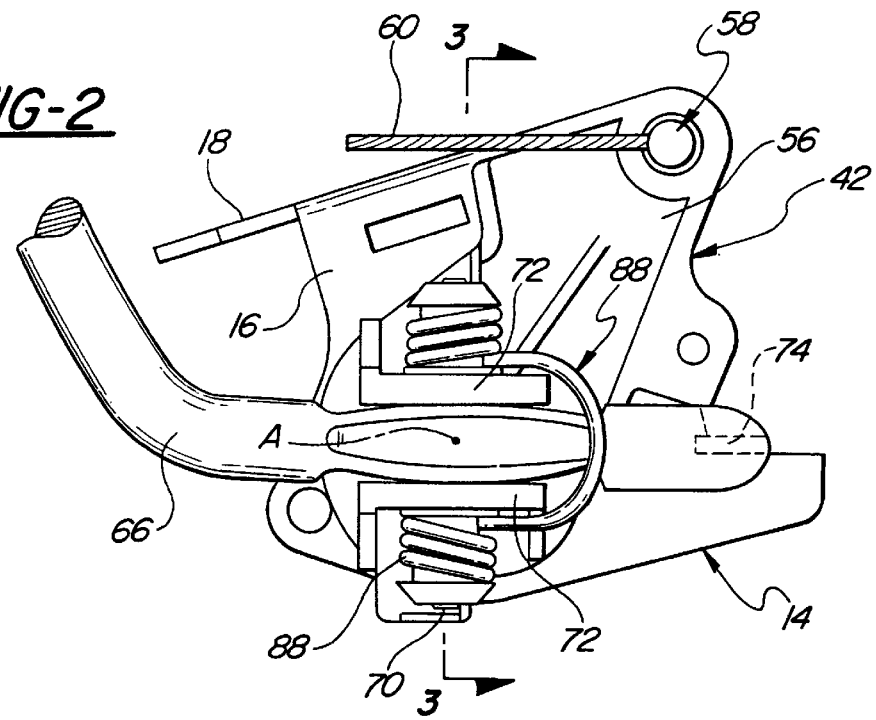
FIG. 2 is an elevational view of one side of the embodiment of FIG. 1 viewed in the direction of sight arrow A.
Figure 4:
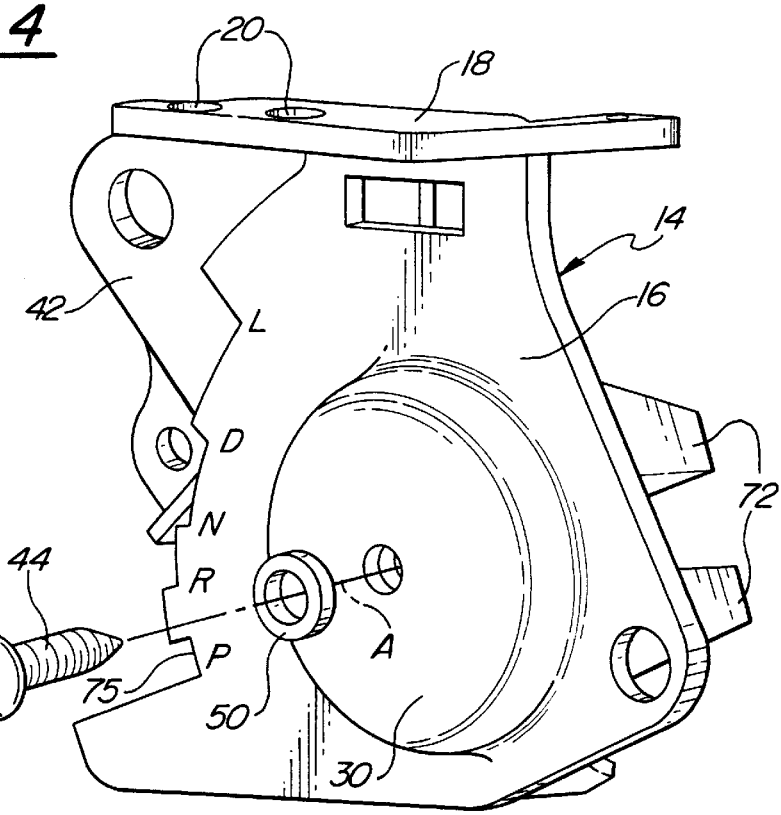
FIG. 4 is a pictorial view of the gate plate and rotatable shifter member being assembled together.
Figure 5:
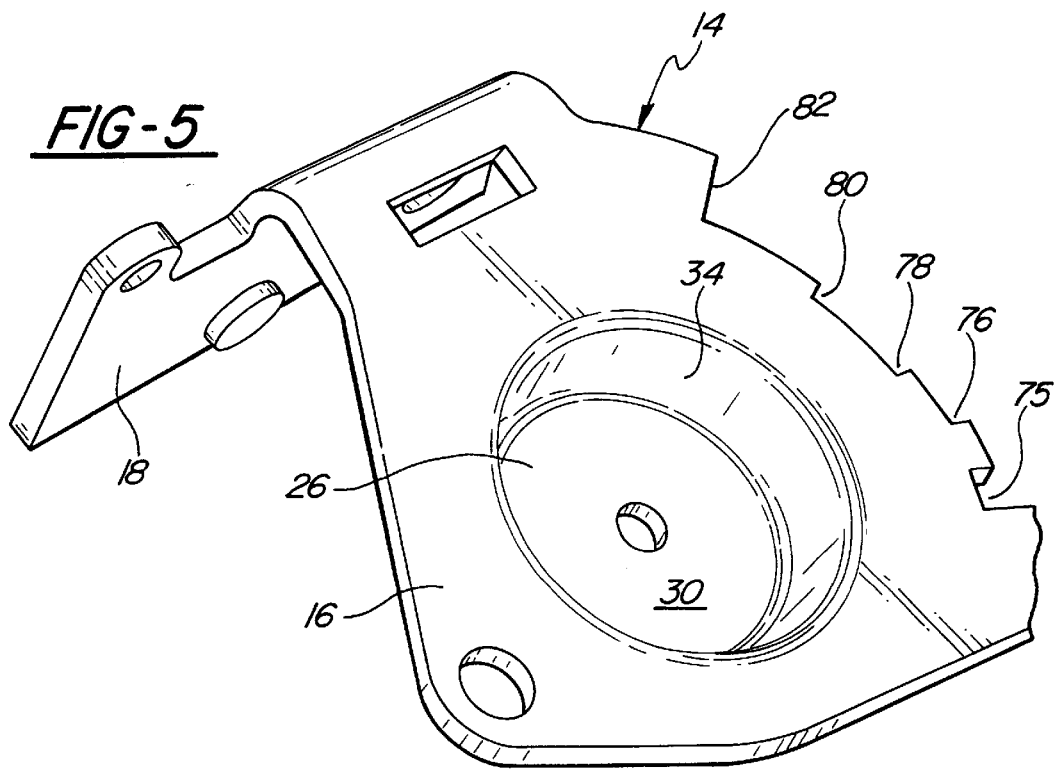
FIG. 5 is a pictorial view of the gate plate of FIGS. 1–4.

The shifter cam 42 is movably mounted for rotation adjacent to the inboard side of the gate plate 14. As best illustrated in FIGS. 2 and 3, the rotatable shifter member 42 has a generally flattened main body 56 that carries a transversely extending pin 58 at a fixed radial distance from the turning axis "A" of the rotatable shifter member 42 and is operatively attached to a push—pull cable 60 that is in turn operatively connected to the actuator lever (not shown) of the automatic transmission such as disclosed in U.S. Pat. No. 4,934,208 issued Jun. 13, 1990 to J. D. Carlstrom for Vehicle Transmission Shifter assigned to the assignee of this invention and hereby incorporated by reference. In response to the turning of the rotatable shifter member 42 on axis "A" by an associated shift or selector lever 66 the actuator lever (not shown) is turned by a cam-like mechanism 58 and the movement of the pull cable 60 to condition the transmission to the various operations thereof.

As best illustrated in FIGS. 1–3 the selector lever 66 is an elongated component having a manual handle or grip 67 on the outboard end thereof. The selector lever 66 is pivotally supported intermediately its ends by a pivot pin 70 supported by a pair of laterally spaced and upstanding lugs 72 extending from the rotatable shifter member 42. The inboard or terminal end of the selector lever 66 defines a pawl 74 disposed at a predetermined angle with respect to the adjacent body portion of the selector lever 66 which can be selectively engaged with the various cut away gate detent positions 75, 76,78,80 and 82 arranged in series on the outer edge of the gate plate 14 which respectively corresponds to park, reverse, neutral, drive and low range operation of the transmission. As disclosed in the above referenced patent to Snell U.S. Pat. No. 5,289,732, the selector lever 66 is normally biased by a coil spring unit 88 operatively mounted on the pivot pin 70 in a counter-clockwise direction so that the pawl 74 engages and is yieldably retained in a selected gate detent of the gate plate 14. Various transmission operations are subsequently and conventionally selected by manually grasping the handle end of the shift lever and exerting a clockwise force thereon to overcome the force of lever spring 88 to move the pawl 74 from the previously selected gate detent and then rotating the rotatable shifter member 42 by the selector lever 66 until the selected transmission operation is achieved and the pawl 74 is moved into the selected gate detent by the action of the lever spring 88.

While one embodiment has been shown and described to illustrate the invention, other embodiments will become apparent from the drawings and description of the invention which fall within the scope of the following claims of the invention.

What is claimed is:

1. An automatic transmission shifter unit for installation on a mounting block of an automotive vehicle, said unit comprising:

a gate plate having an attachment flange for connection to said mounting block and further having a side plate with a plurality of gate detents formed thereon corresponding to the different operations of the transmission;

an annular and axially projecting pocket formed in said gate plate;

a ball bearing unit supported in said pocket having an annular outer race operatively engaging the inner annular side wall of said gate plate defining the peripheral wall of said pocket, said ball bearing unit having an inner annular race and an endless train of balls operatively mounted between the outer and inner races;

a rotatable shifter member mounted for limited rotation about an axis transverse to said gate plate, said rotatable shifter member having an axially extending hub disposed within said pocket and supported by said inner race of said ball bearing unit;

an attachment member extending through said gate plate and into said shifter member for securing said rotatable shifter member in operative position with respect to said gate plate, a manual shift lever operatively carried by said rotatable shifter member to different predetermined positions corresponding to the different operations of said automatic transmission; and a spring for urging said lever into a fixed position with respect to said gate plate and for yielding in response to a release movement of said lever so that said lever and said rotatable shifter member can be subsequently turned to change the operating condition of said transmission.

2. A shifter unit adapted for selecting the different operations of an automatic transmission employed in an automotive vehicle, said shifter unit comprising:

a gate plate having a plurality of discrete stop positioning gate detents corresponding to the forward drives, neutral, reverse and park conditions of the transmission;

an annular pocket formed in the side of said gate plate;

a ball bearing unit operatively supported in said pocket, said ball bearing unit having inner and outer races and an endless train of balls therein and establishing an axis of rotation extending across said gate plate, a rotatable shifter member having an axially extending hub projecting into said inner race and operatively supported for rotation with respect to said axis, a retention screw extending through said gate plate and into said hub for securing said rotatable shifter member to said plate with the ball bearing unit sandwiched therebetween; and a selector lever operatively mounted on said rotatable shifter member for selective and releasable locking engagement with said gate plate.

3. The shifter unit of claim 2 wherein said hub has a conical surface for seating the inner race of the ball bearing unit thereon and wherein said ball bearing unit establishes and permanently fixes the spacing between the gate plate and said rotatable shifter member.

4. A shift unit adapted for selecting the operations of an automatic transmission employed in an automotive vehicle, said unit comprising:

a gate plate adapted to be fixed to a mounting block of the automotive vehicle, said gate plate being provided with a plurality of discrete stop positioning gate detents corresponding to the forward, neutral, reverse and park drive conditions of the transmission;

an annular pocket formed in the side of said gate plate and offset from the major plane thereof, a ball bearing unit operatively mounted in said pocket, said ball bearing unit having inner and outer races and an endless train of balls therein and defining a rotating shifter member having an axially extending hub projecting into said inner race and into said pocket for support by said ball bearing unit permitting rotation with respect to an axis;

a retention screw extending through said gate plate and into said hub for securing said rotatable shifter member to said plate with the ball bearing unit sandwiched therebetween; and a selector lever operatively mounted on said rotatable shifter member for locking engagement with said gate plate and being shiftable therefrom.

* * * * *